United States Patent
Dobyns

(10) Patent No.: US 8,746,712 B2
(45) Date of Patent: Jun. 10, 2014

(54) MATTRESS MOVING DEVICE

(71) Applicant: Victor D. Dobyns, Vancouver, WA (US)

(72) Inventor: Victor D. Dobyns, Vancouver, WA (US)

(*) Notice: Subject to any disclaimer, the term of this patent is extended or adjusted under 35 U.S.C. 154(b) by 0 days.

(21) Appl. No.: 13/622,480

(22) Filed: Sep. 19, 2012

(65) Prior Publication Data

US 2013/0154217 A1 Jun. 20, 2013

Related U.S. Application Data

(60) Provisional application No. 61/536,256, filed on Sep. 19, 2011.

(51) Int. Cl.
*B62B 1/26* (2006.01)

(52) U.S. Cl.
USPC ............................................. 280/79.7; 280/63

(58) Field of Classification Search
USPC ........................................ 280/79.7, 79.11, 63
See application file for complete search history.

(56) References Cited

U.S. PATENT DOCUMENTS

| | | | | | |
|---|---|---|---|---|---|
| 1,788,150 | A | * | 1/1931 | Curtin | 280/35 |
| 2,375,338 | A | * | 5/1945 | Alexander | 280/47.131 |
| 2,509,575 | A | * | 5/1950 | Mingo | 280/38 |
| 2,670,969 | A | * | 3/1954 | Costikyan | 410/51 |
| 2,696,990 | A | * | 12/1954 | Davis | 280/47.131 |
| 4,772,035 | A | * | 9/1988 | Danial | 280/47.3 |
| 4,978,132 | A | * | 12/1990 | Wilson et al. | 280/47.131 |

\* cited by examiner

*Primary Examiner* — Hau Phan
*Assistant Examiner* — Bryan Evans
(74) *Attorney, Agent, or Firm* — Meister Seelig & Fein LLP

(57) ABSTRACT

In one aspect, a device for moving objects is provided that includes a carriage having a first planer bearing member coupled to a second planer bearing member therewith forming a recess, each of the bearing members having a plurality of holes therein opposite an intersection of the bearing members; at least one wheel coupled to the carriage member, the wheel having an axis parallel with the intersection of the bearing members; and a first and a second strap having ends removably attachable to each other, each of the straps passing through one of the bearing members.

9 Claims, 2 Drawing Sheets

MATTRESS MOVING DEVICE

RELATED APPLICATION

The present application claims the benefit of U.S. Provisional Patent Application No. 61/536,256, filed Sep. 19, 2011, which is incorporated herein by reference in its entirety.

BACKGROUND

The present application relates to moving devices and more particularly devices for moving mattresses.

A number of devices are used for moving furniture, such as dollies and handcarts. These devices, however, are not well suited for moving mattresses in that they are difficult to maneuver when loaded with a mattress and/or are not compact enough for an individual to keep for routinely moving a mattress. Accordingly, there is a need for a mattress moving device which is not so limited.

SUMMARY OF THE INVENTION

In one aspect, a device for moving objects is provided that includes a carriage having a first planer bearing member coupled to a second planer bearing member therewith forming a recess, each of the bearing members having a plurality of holes therein opposite an intersection of the bearing members; at least one wheel coupled to the carriage member, the wheel having an axis parallel with the intersection of the bearing members; and a first and a second strap having ends removably attachable to each other, each of the straps passing through one of the bearing members as illustrated on the attached drawings; and a third strap binding the other two straps to each other, running from one strap to the other along the outside edge of the mattress around the corner opposite the carriage.

In at least one embodiment, the bearing members are essentially orthogonal to each other.

In at least one embodiment, the device includes at least one strut member coupled to each of the bearing members.

In at least one embodiment, the device includes a plurality of wheels mounted on an axle that extends essentially parallel to the intersection of the bearing members.

In at least one embodiment, the axle is located along one of the bearing members essentially at least 1 inch from the intersection of the bearing members.

In at least one embodiment, each of the straps includes at least one buckle for removably securing the ends of the strap to each other.

In at least one embodiment, the device includes a handle, a tub approximately 6" long and 1½" in diameter through which the strap passes. In at least one embodiment, the device includes a hand-hold in the body of the device that is a part of one of the bearing members.

In at least one embodiment, the device includes a pair of strut members coupled to each of the bearing members at opposite lateral ends of the bearing members, and least one planer spacer removably attachable to the bearing members to narrow a lateral distance between the strut members.

In at least one embodiment, the spacer is movable incrementally in a plurality of lateral positions between the strut members.

DETAILED DESCRIPTION

Figure 1:
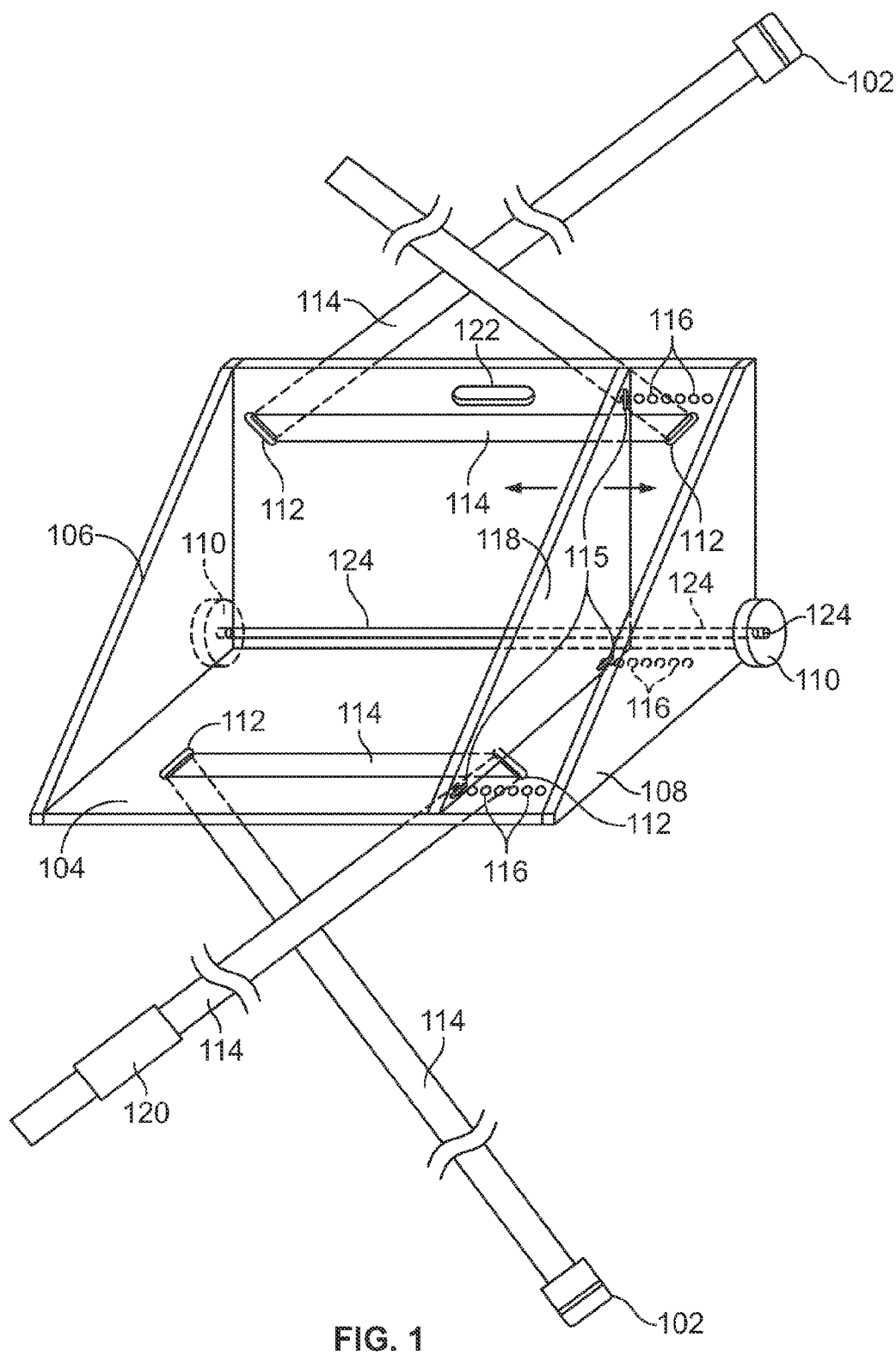
FIG. 1 is perspective view of the mattress moving device according to one embodiment of the devices discussed herein.
Figure 2:
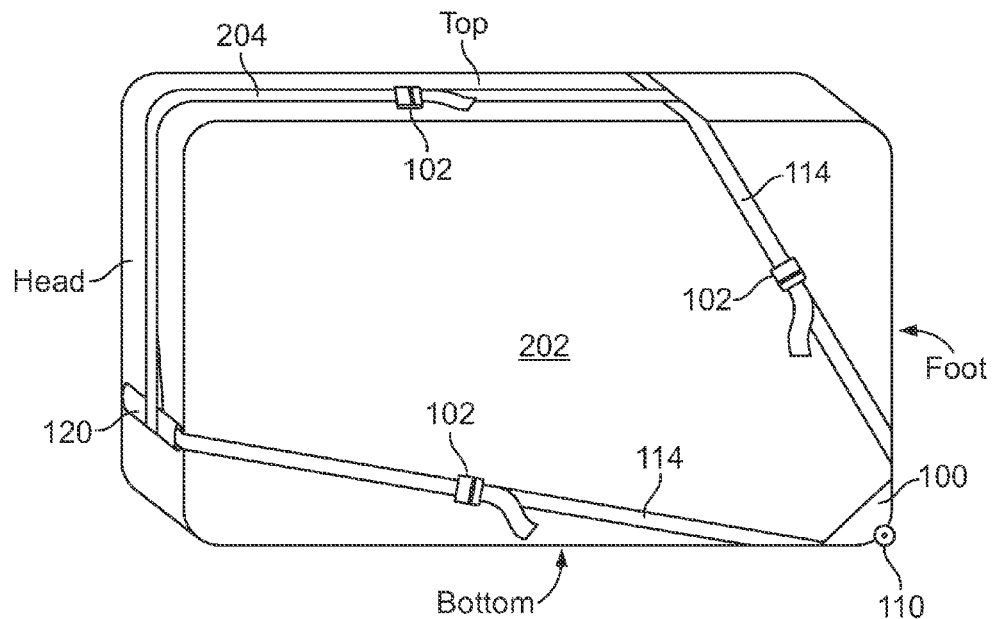
FIG. 2 is a side view of the mattress moving device according to one embodiment of the devices discussed herein loaded with a mattress.
Figures 3, 4, 5, 6:
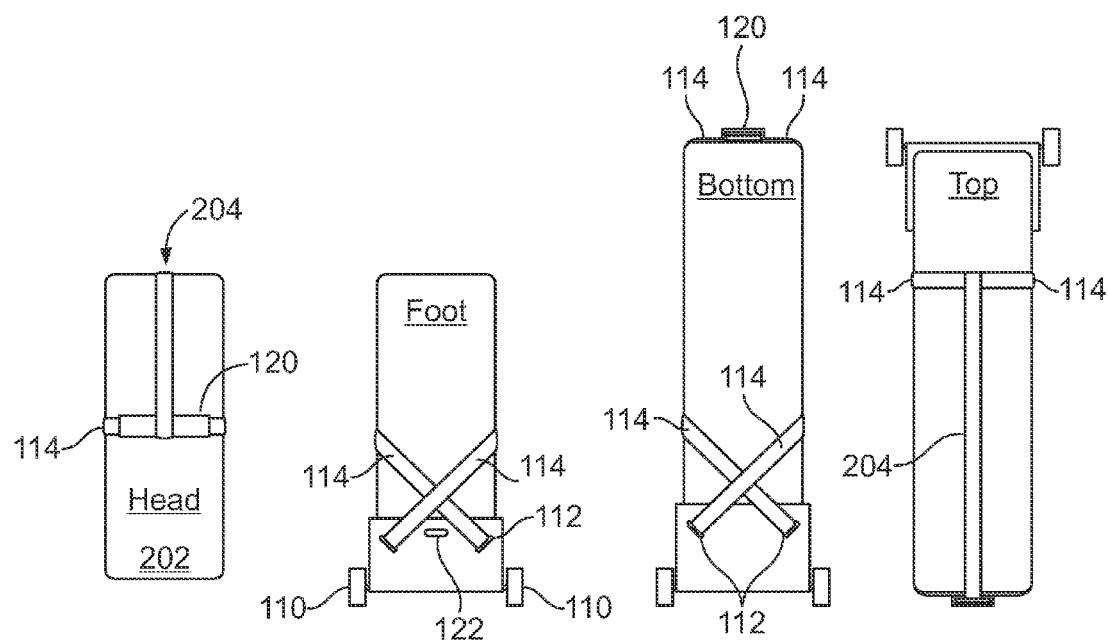
FIGS. 3-6 are end views of the mattress moving device according to one embodiment of the devices discussed herein loaded with a mattress.

Referring to FIG. 1-6, the present application generally provides a device for moving a mattress 202 that consists of a carriage 100, with at least one or preferably two wheels 110 attached to a lower most corner of the carriage 100. The carriage 100 accepts a mattress that is secured to the carriage 100 with two straps 114 as depicted in the accompanying figures. Carriage 100 generally has an orthogonal recess that receives a corner of the mattress placed therein. The recess is defined by a pair of bearing members 102, 104, that generally bear the weight of the mattress placed therein. The bearing members 102, 104 are preferably planer structures located orthogonal or at another angle to each other. The wheels 100 are preferably located at the intersection of the bearing members 102, 104, preferably so that they extend approximately 1" from the intersection of bearing member 102 and 104 on bearing member 102 (the side with the hand-hold 122) and the maximum possible beyond member 102 with the axle mounted on the inside of members 102, 104; and are parallel to the plane of the mattress placed in the carriage. A hole or holes may extend laterally across the carriage 100 to accommodate an axle 124 for the wheels 110. The axle 124 is preferably about 1" away from the intersection of the bearing member 104, and right next to member 102. The placement of the axle allows the device to function efficiently when moving a mattress up and down stairs.

The bearing members 102, 104 may be coupled to each other in a fixed relationship or may be hinged to each other at the intersection. In the later instance, the carriage 100 is operable therewith to be folded when not in use. The carriage 100 may further include one or a pair of strut members 106, 108 coupled at least to the outer edges of the bearing members 102, 104. The strut members 106, 108 may be continuous planer structures in the fixed embodiment or may be flexible cords to allow for the hinged embodiment.

The pair of lateral straps 114 pass through holes 112 at each end of the carriage 100. The opposite ends of each of the straps 114 are preferably securable to each other, for example, with a belt/buckle, a hook and loop, etc. arrangement. The device may further include a strap 204 for interconnecting each lateral straps 114 to each other. The straps 114, 204 preferably have adjustable lengths to accommodate all sizes of mattresses. One or each of the straps 114 also includes a handle 120 slidingly engaged along the strap 114 that allows one ordinary person to grab hold of the mattress 202 when secured to the device and move the mattress 202 over a variety of surfaces including wood floors, carpeting, concrete, blacktop and gravel. The carriage 100 may also be fitted with a hand-hold 122 attached to or part of the carriage 100 (i.e., a hand-hold cut into one of the bearing members) to make it easy for a second person to assist by lifting the mattress-device assembly from the carriage hand-hold, i.e., the opposite end of mattress 202 from handle 122.

In one embodiment, there are three straps 114, 204 in all for attaching the mattress to the carriage 100. Referring to the mattress as having a head and foot (as shown in FIGS. 3-6) and two sides, one strap 114 goes through the carriage 100 (which is mounted on a corner at the foot of the mattress), around the head of the mattress, and back to the other end of the same strap 114, attached thereto with a buckle. The second strap 114 goes through the carriage and around the other side of the mattress and back to the other end of the second strap 114, attached with a buckle. The third strap 204 holds the other two straps 114 together along the sides of the mattress, going around the corner of the mattress opposite the corner that the carriage is mounted to. The third strap 204 may be a resilient bungee cord that would accommodate different sizes of mattresses. Both straps may be installed so they cross themselves after leaving the carriage 100 before going around the head and side of the mattress. The crossing of the straps keeps the mattress firmly attached to the carriage. The handle 120 is preferably attached to the strap 114 that goes around the head of the mattress as shown in FIGS. 2-6.

The device makes it possible for one person to move a mattress up and down stairs, unlike any of the other devices currently being used to move furniture. The device operates much like an appliance dolly, except that the corner of the mattress fits securely in the recess of the carriage 100. When attached, the mattress will stand upright with very little if any balancing necessary. The dimensions of the carriage 100 may vary. In one embodiment, the inside width (dimension between strut members 106, 108) of the carriage 100 may be between about 10" to about 24", or greater depending on the thickness of the mattress intended for the device. The height of the bearing members 102, 104 measured from the intersection thereof may be between about 6" to about 22'. These heights may be equal or unequal lengths. The optimum shape of the side of the carriage would probably be an equilateral triangle about 12" long for each of the outside edges, although the dimensions may vary according to the size of the mattress.

In one embodiment, the device includes at least one spacer 118, which can be inserted between the mattress and the inside of the carriage 100 to steady narrower mattresses. Similarly, the carriage 100 may have an adjustable width between the strut members 106, 108 that would eliminate the need for more than one spacer to accommodate narrower mattresses. For example, the spacer 118 may be adjustable in one or a plurality of positions laterally between the strut members 106, 108. This may be accomplished with a plurality of sets of holes 116 in the bearing members 102, 104 with corresponding pins in the spacer 118 that are aligned with the sets of holes 116 for the spacer 118 to be removably attached to the carriage 100 in one of the plurality of lateral positions within the carriage recess. The sets of holes 116 are preferably spaced about 1" from each other so that the spacer 118 may be moved laterally in 1 inch increments. Additionally, an accessory may be provided that consists of two rectangular boards that would be inserted into the carriage 100, one on either side of the mattress 202, that extend diagonally beyond the corner of the mattress 202 in a direction opposite the carriage 100, and secured to each other beyond the opposite corner of the mattress by a short strap or bungee cord. This would serve to support narrower mattresses that are too floppy to stand up on their own. Although the device is described as a mattress mover, the device may also be used to move similarly sized objects, such as plywood, wall boards, furniture, etc.

While the foregoing has been described in some detail for purposes of clarity and understanding, it will be appreciated by one skilled in the art, from a reading of the disclosure, that various changes in form and detail can be made without departing from the true scope of the invention.

What is claimed is:

1. A device for moving objects comprising;
   a carriage having a first planer bearing member coupled to a second planer bearing member therewith forming a recess, each of the bearing members having a plurality of holes therein opposite an intersection of the bearing members;
   a pair of strut members coupled to each of the bearing members at opposite lateral ends of the bearing members so as to have a fixed lateral distance between the strut members, and at least one movable planer spacer removably attached to the bearing members to narrow a lateral distance between at least one strut member and the planer spacer;
   at least one wheel coupled to the carriage member, the wheel having an axis parallel with the intersection of the bearing members; and
   a first and a second strap having ends removably attachable to each other, each of the first and second straps passing through one of the bearing members to form a first loop, and a third and fourth straps having ends removably attachable to each other, each of the third and fourth straps passing through one of the bearing members to form a second loop, and a fifth strap attached at one end to the first loop and at another end to the second loop.

2. The device of claim 1, wherein the bearing members are essentially orthogonal to each other.

3. The device of claim 1, comprising a plurality of wheels mounted on an axle that extends essentially parallel to the intersection of the bearing members.

4. The device of claim 3, wherein the axle is located along one of the bearing members essentially at least 1 inch from the intersection of the bearing members.

5. The device of claim 1, wherein each of the straps includes at least one buckle for removably securing the ends of the strap to each other.

6. The device of claim 1, comprising a handle through which at least one of the straps passes.

7. The device of claim 1, comprising a handle that is a part of one of the bearing members.

8. The device of claim 1, wherein the spacer is movable incrementally in a plurality of lateral positions between the strut members.

9. The device of claim 1, wherein the straps of each of the first loop and the second loop cross at least once.

* * * * *